(12) United States Patent
Brunnmayr (10) Patent No.: US 9,277,815 B2
(45) Date of Patent: Mar. 8, 2016

(54) DRIVE DEVICE FOR A MOVABLE FURNITURE PART

(71) Applicant: Julius Blum GmbH, Hoechst (AT)

(72) Inventor: Harald Brunnmayr, Hoerbranz (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 14/865,045

(22) Filed: Sep. 25, 2015

(65) Prior Publication Data

US 2016/0007749 A1 Jan. 14, 2016

Related U.S. Application Data

(63) Continuation of application No. PCT/AT2014/000058, filed on Mar. 26, 2014.

(30) Foreign Application Priority Data

Apr. 12, 2013 (AT) .................................. A 295/2013

(51) Int. Cl.
*A47B 88/00* (2006.01)
*A47B 88/04* (2006.01)
(Continued)

(52) U.S. Cl.
CPC ............. *A47B 88/0477* (2013.01); *A47B 88/08* (2013.01); *A47B 88/16* (2013.01)

(58) Field of Classification Search
CPC .... A47B 88/0477; A47B 88/08; A47B 88/16; A47B 88/0481; A47B 88/0414; A47B 96/00
See application file for complete search history.

(56) References Cited

U.S. PATENT DOCUMENTS 5,040,833 A * 8/1991 Brunnert ............ A47B 88/0477
292/80
8,714,671 B2 * 5/2014 Huang ................. A47B 88/047
312/319.2

(Continued)

FOREIGN PATENT DOCUMENTS

| AT | 511 329 | 11/2012 |
|---|---|---|
| AT | 512 919 | 12/2013 |

(Continued)

OTHER PUBLICATIONS

International Search Report issued Jul. 24, 2014 in corresponding International Application No. PCT/AT2014/000058 (with English translation).

*Primary Examiner* — Hanh V Tran
(74) *Attorney, Agent, or Firm* — Wenderoth, Lind & Ponack, L.L.P.

(57) ABSTRACT

A drive device for a movable furniture part includes a lockable ejection device. The ejection device has a force-actuated ejection lever for ejecting the movable furniture part along an ejection section from a closed position into an open position. In the closed position, the ejection lever bears against a locking element in a locking position. By moving the movable furniture part into a pressed-over position situated behind the closed position in the closing direction, the ejection device can be unlocked in that the locking element opens up a first path in the ejection section for the ejection lever. By pulling on the movable furniture part, the ejection device can be brought from the closed position into a pull-unlocking position in front of the closed position in the opening direction so that the ejection lever passes into the ejection section over a second path space apart from the first path.

16 Claims, 11 Drawing Sheets (51) Int. Cl.
    *A47B 88/08*    (2006.01)
    *A47B 88/16*    (2006.01)

(56) References Cited

U.S. PATENT DOCUMENTS

| | | | | |
|---|---|---|---|---|
| 8,807,671 | B2 * | 8/2014 | Brunnmayr | A47B 88/16 312/319.1 |
| 9,204,721 | B2 * | 12/2015 | Gasser | A47B 88/04 |
| 9,215,929 | B2 * | 12/2015 | Brunnmayr | A47B 88/0481 |
| 2007/0090735 | A1 * | 4/2007 | Hashemi | A47B 88/0477 312/334.46 |
| 2008/0191592 | A1 * | 8/2008 | Dubach | A47B 88/0477 312/319.1 |
| 2013/0140970 | A1 * | 6/2013 | Dubach | A47B 88/0477 312/319.1 |
| 2014/0021841 | A1 | 1/2014 | Brunnmayr | |
| 2014/0300262 | A1 * | 10/2014 | Flogaus | A47B 88/0481 312/319.1 |
| 2014/0327351 | A1 * | 11/2014 | Chung | A47B 88/0477 312/333 |

FOREIGN PATENT DOCUMENTS

| | | |
|---|---|---|
| DE | 20 2009 005 256 | 12/2010 |
| EP | 1 921 948 | 5/2008 |
| EP | 2 272 400 | 1/2011 |
| WO | 2011/143682 | 11/2011 |
| WO | 2012/010589 | 1/2012 |
| WO | 2012/149587 | 11/2012 |

\* cited by examiner

DRIVE DEVICE FOR A MOVABLE FURNITURE PART

The invention concerns a drive device for a moveable furniture part comprising a lockable ejection device, wherein the ejection device has a force-actuated ejection lever for ejection of the moveable furniture part along an ejection portion from a closed position into an open position, wherein the ejection lever in the closed position bears against a locking element in a locking position and wherein the ejection device is unlockable by movement of the moveable furniture part into an over-pressing position behind the closed position in the closing direction, by the locking element enabling a first travel path into the ejection portion for the ejection lever. The invention further concerns an article of furniture having such a drive device.

There have already been so-called touch latch mechanisms in the furniture fitting industry for many years, with which unlocking is effected by pressing against the moveable furniture part which is in the closed position (for example drawer, furniture door, furniture flap or the like), whereupon the moveable furniture part is actively ejected in the opening direction by the mechanism (ejection device). In that respect there are different structural variants for locking and for ejection.

In that respect a first variant of a different general kind involves locking an ejection element by way of a guide pin lockable in a cardioid-shaped guide path. In that respect the function of locking and the function of ejection are attributed to different components. On the one hand the locking pin serves for locking in the cardioid-shaped guide path while on the other hand a separate spring-actuated ejection element serves for ejection of the moveable furniture part after unlocking by over-pressing. An example of this is WO 2012/149587. In general, in touch latch mechanisms, there is also often a wish for unlocking to be guaranteed not just by over-pressing but also by pulling on the moveable furniture part. In WO 2012/149587 relating to a different kind of device that is achieved in that a spring-loaded blocking element is disposed in the region of the latching recess of the cardioid-shaped guide path, which blocking element is moved upon pulling on the moveable furniture part by the locking pin whereby a second unlocking passage is opened up. As a result, in such a touch latch mechanism, both unlocking by over-pressing and also unlocking by pulling and subsequently active ejection are implemented.

Now there is also a wish in touch latch mechanisms of the same general kind of device as set forth herein, with an ejection lever, to implement such triggering by pulling. As examples of previously known drive devices in which the ejection lever has a dual function, namely that the ejection lever itself is both locked and also ejects, are known from EP 1 921 948 A1, WO 2011/143682 A1 and Austrian A 1249/2012 to the present applicant, which is not a prior publication. In those drive devices or touch latch mechanisms, an ejection lever bears against a locking element in the closed position and is released from the locking element by over-pressing into the over-pressing position so that the path of movement into an ejection portion is cleared by the ejection lever bearing against an ejection surface. It is admittedly possible for the moveable furniture part to be also opened by pulling with those mechanisms, but opening by pulling does not involve active ejection by an ejection force storage means.

Therefore the object of the present invention is also to implement triggering by pulling in a drive device of the general kind set forth.

That is achieved by a drive device having the features of claim 1. Accordingly it is provided that by pulling on the moveable furniture part the ejection device can be moved from the closed position into a pulling unlocking position which is before the closed position in the opening direction whereby the ejection lever passes into the ejection portion by way of a second travel path spaced from the first travel path. Accordingly the ejection lever itself passes into the ejection portion by way of a second travel path. It is therefore possible to pass around the locking element not just on one side but on two sides so that then the ejection lever actively ejects the moveable furniture part.

As soon as the ejection lever is in the ejection portion it is preferably provided that the moveable furniture part is moveable in the opening direction by the force-actuated ejection lever by way of a main ejection surface.

In principle it can be provided that, upon unlocking by pulling, after passing around the locking element along the second travel path, the ejection lever also bears against the main ejection surface. It is preferably provided however that a second ejection surface spaced from the main ejection surface is provided along the second travel path. In that respect, for a simple structure, it is preferably provided that the second ejection surface is provided on the locking element. Naturally upon unlocking by pulling the ejection lever can also bear successively against the second ejection surface and then against the main ejection surface or only against the second ejection surface.

A preferred embodiment provides that the ejection lever is mounted rotatably to an ejection lever base plate, wherein an ejection force storage means, preferably a tension spring acting on a leg of the ejection lever, provides for force actuation of the ejection lever. In that case the ejection force storage means is fixed on the one hand to the ejection lever and on the other hand to the ejection lever base plate.

It can further preferably be provided that the drive device has a guide path for the ejection lever, wherein the guide path has a free-running portion, a stressing portion for stressing the ejection force storage means, a retraction portion for retraction of the moveable furniture part from an open position into the closed position, the first travel path, the second travel path and the ejection portion, wherein the stressing portion and the retraction portion are different from the first travel path and from the second travel path.

Furthermore in a preferred embodiment of the present invention there is provided a control plate and a control element mounted moveably to the control plate, wherein the control element also forms at least the stressing portion and the retraction portion. Preferably that control plate substantially also forms the guide path. In that respect it can further be preferably provided that the control element is acted upon by a force storage means which acts on the control element in a direction facing away from the main ejection surface. In that case the force storage means is fixed on the one hand to the control element and on the other hand to the control plate. In an embodiment that force storage means is in the form of tension spring.

In addition it is preferably provided that the locking element is mounted moveably, preferably slidably, relative to the control plate, wherein particularly preferably the locking element is mounted moveably to the control element. In order also to permit a movement of the locking element relative to the control element it is provided that the locking element is acted upon by a force storage means pulling the locking element in the direction of the control element. That force storage means is preferably also in the form of a tension spring, wherein that force storage means is fixed on the one hand to the locking element and on the other hand to the control element.

By virtue of that configuration of the control element and the locking element it can be provided that the first travel path is arranged between the locking element and the main ejection surface and the second travel path is arranged between the locking element and the control element.

Protection is also claimed for an article of furniture having a furniture carcass, a moveable furniture part and a drive device according to the invention. It is preferably provided in such a furniture part that the moveable furniture part is mounted moveably to the furniture carcass by way of an extension guide means, the extension guide means having at least a carcass rail and a drawer rail.

In principle the ejection lever of the ejection device can be associated with the furniture carcass and actively eject the moveable furniture part. In a preferred embodiment however it is provided that the ejection lever is associated with the moveable furniture part and thus bears against the furniture carcass. It is preferably provided in that case that the control plate of the drive device is fixed to the carcass rail and the ejection lever base plate is fixed to the drawer rail or the moveable furniture part, preferably at an underside of a drawer bottom.

Further details and advantages of the present invention will be described more fully hereinafter by means of the specific description with reference to the embodiments by way of example illustrated in the drawings in which.

Figure 1:
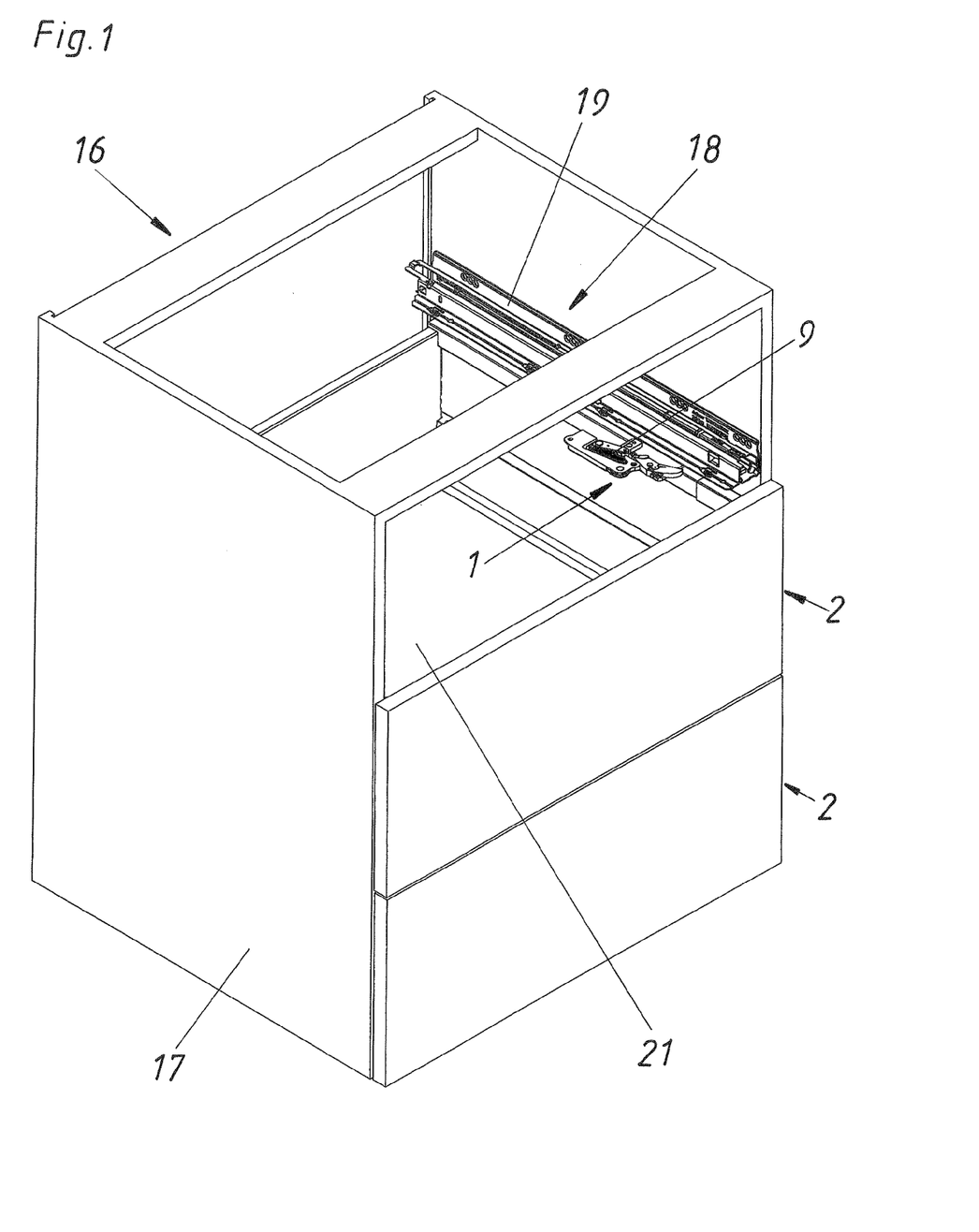
FIG. 1 shows an article of furniture with extension guide means and drive device.

FIG. 1 shows the article of furniture 16 with furniture parts 2 mounted moveably in the furniture carcass 17. Those moveable furniture parts 2 are moveably fixed to the furniture carcass 17 by way of extension guide means 18 mounted to the furniture carcass 17 at both sides. The extension guide means 18 itself comprises a carcass rail 19 fixed to the furniture carcass 17, a drawer rail (not shown) and optionally a central rail. In this case the moveable furniture part 2 is a drawer with a drawer container with drawer bottom 21. The drive device 1 is fixed to the extension guide means 18 and to the underside of a drawer bottom 21 of an uppermost drawer (not shown here).

Figure 2:
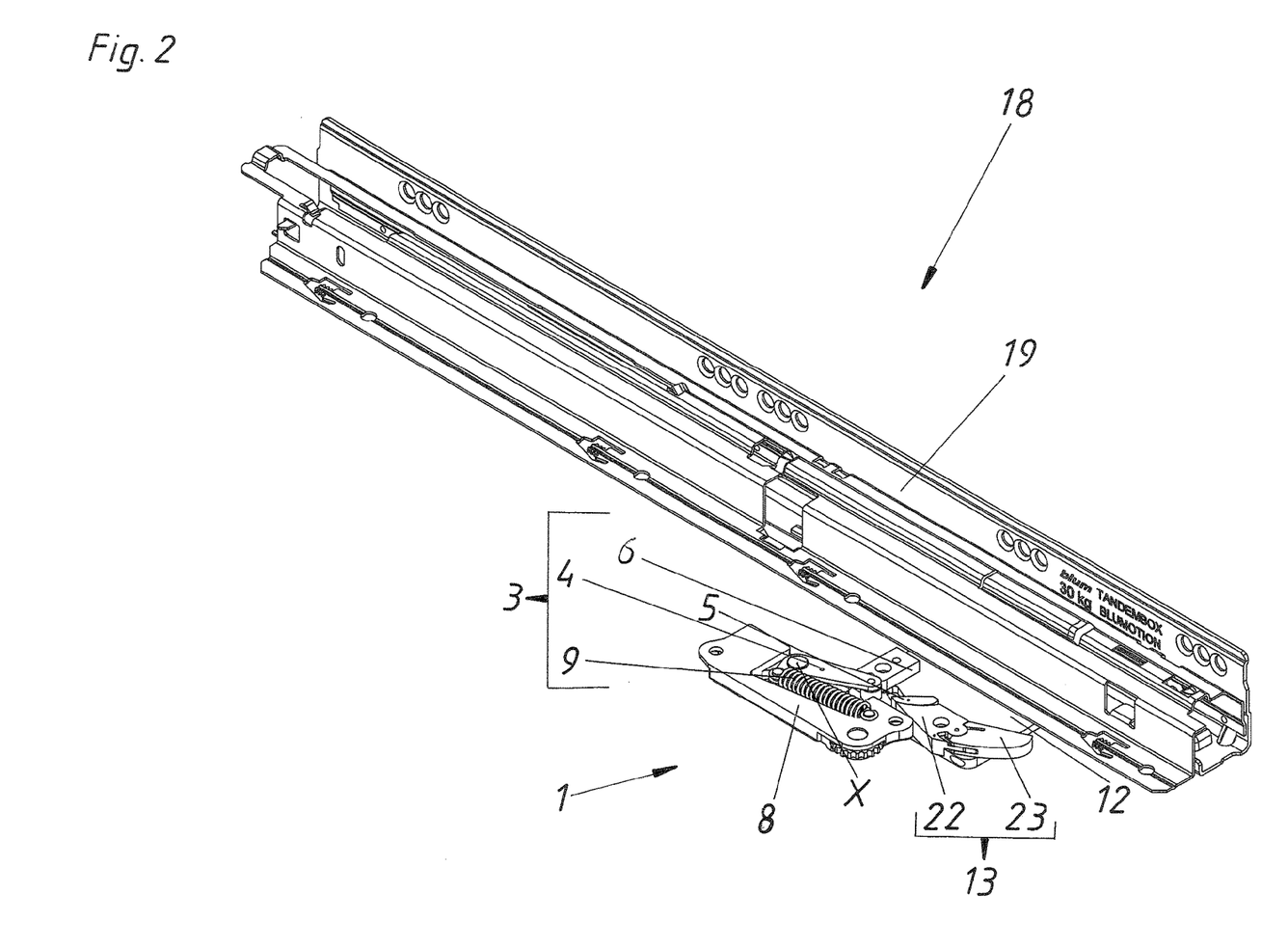
FIG. 2 shows the extension guide means with the drive device.

It can more specifically be seen from FIG. 2 that the control plate 12 is mounted to the carcass rail 19. The control element 13 is in turn linearly moveably mounted to the control plate 12, the control element 13 having on the one hand the control base 22 and the flap 23 mounted pivotably thereto. In addition the main ejection surface 6 is provided on the control plate 12. The ejection lever base plate 8 is mounted opposite thereto at the underside of a drawer bottom 21. The ejection lever 4 is mounted rotatably about the pivot axis X at that ejection lever base plate 8. The ejection force storage means 9 is stressed between the ejection lever 4 and the ejection lever base plate 8, the force storage means 9 in this case being in the form of a tension spring. The essential components of the ejection device 3 are the ejection force storage means 9, the ejection lever 4, the locking element 5 and the main ejection surface 6. The locking element 5 is mounted moveably relative to the control plate 12. In the specific case the locking element 5 is mounted moveably to the control element 13 and is also mounted moveably indirectly relative to the control plate 12 by way of that control element 13. In principle the ejection lever base plate 8 can also be fixed to the drawer rail 20. It is also possible for the control plate 12 to be fixed directly to the furniture carcass 17.

Figure 3:
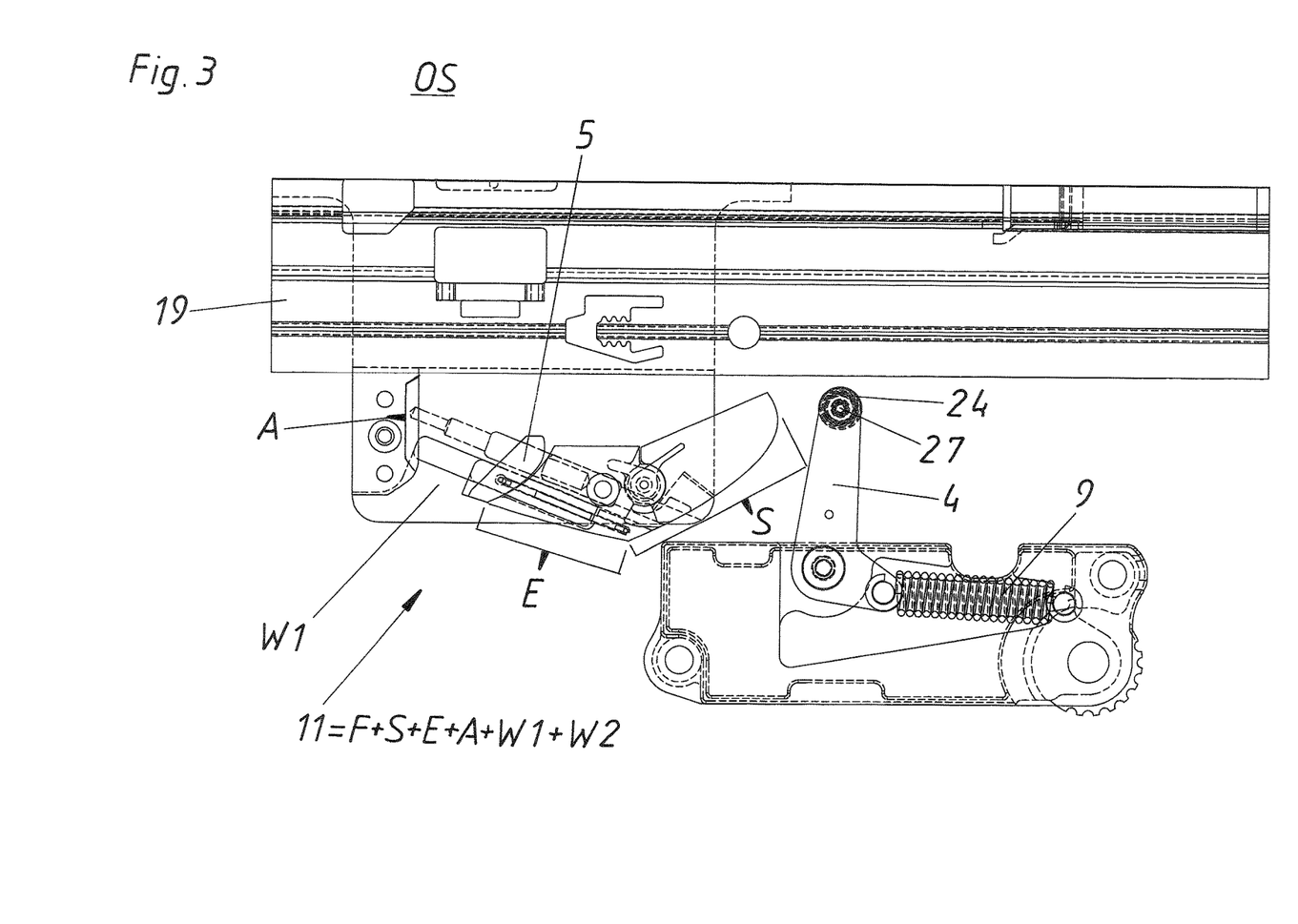
FIG. 3 shows the drive device with the moveable furniture part in the free-running condition.

In FIG. 3 the moveable furniture part 2 is in a wide-opened open position OS in which the control lever 4 is in a free-running portion of the guide path 11. The guide path 11 also has the stressing portion S, the retraction portion E and the ejection portion A. The ejection roller 24 is mounted to the ejection lever 4 rotatably by way of a rotary bearing 27. The ejection lever 4 is acted upon by the ejection force storage means 9.

Figure 4:
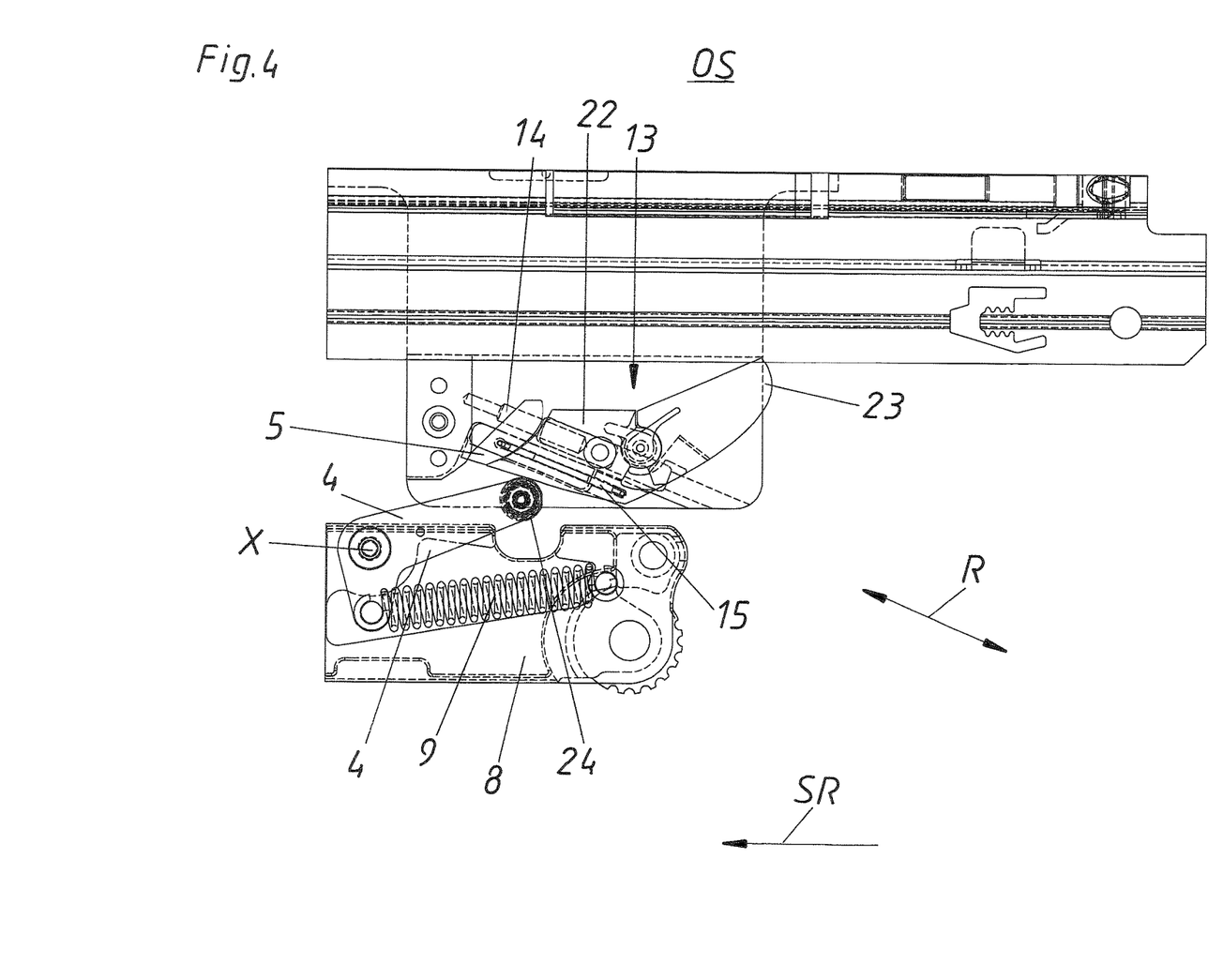
FIG. 4 shows the drive device when retracting the moveable furniture part.

When the moveable furniture part 2 is moved in the closing direction starting from the FIG. 3 position then the ejection lever 4 firstly passes by way of the ejection roller 24 into a condition of abutment with the stressing portion S of the control element 13 (not shown). As the spring force of the ejection force storage means 9 is higher than that of the force storage means 14 the entire control element 13 is moved in opposite relationship to the direction R towards the main ejection surface 6, with the force storage means 14 being stressed. As soon as the control element 13 cannot move any further towards the left and at the same time is also pressed in the closing direction SR against the moveable furniture part 2 the ejection force storage means 9 is stressed by the ejection lever 4 rotating in the clockwise direction about the pivot axis X. When the transitional position between the stressing portion S and the retraction portion E is reached the ejection force storage means 9 is fully stressed and then functions along the retraction portion E as a retraction force storage means (see FIG. 4). As, in its functioning as a retraction force storage means, the ejection force storage means 9 is relieved of stress, the moveable furniture part 2 is actively retracted in the closing direction SR. That retraction movement can also be damped by a damping device (not shown). By virtue of the relatively strong mechanical contact of the ejection roller 24 with the control base 22, the control element 13 continues to be held during the retraction movement in the position in which the force storage means 14 for the control element 13 remains stressed.

Figure 5:
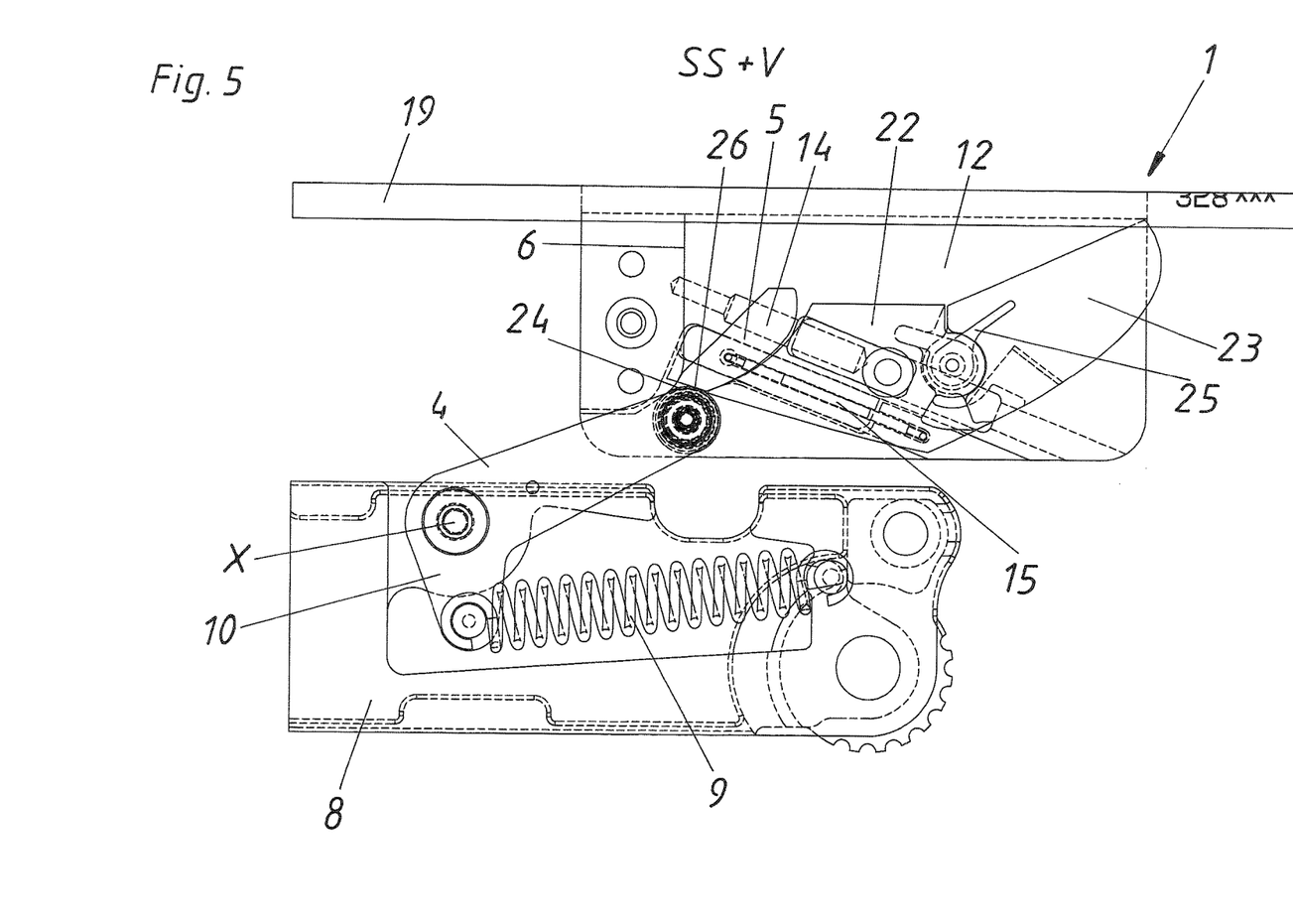
FIG. 5 shows the drive device when reaching the closed position.

At the end of the retraction movement the ejection lever 4 together with the ejection roller 24 passes into the locking position V shown in FIG. 5. That corresponds to the closed position SS of the moveable furniture part. In that case the ejection force storage means 9 is again in part relieved of stress, but still has sufficient residual energy for the ejection movement which occurs later. As can be seen from FIG. 5 the ejection roller 24 now only bears against the locking surface 26 of the locking element 5 shortly after the termination of the retraction movement. As a result there is no longer mechanical contact between the ejection roller 24 and the control base 22 whereby the force storage means 14 can be relieved of stress and the control element 13 is moved in the direction R facing away from the main ejection surface 6 (see FIG. 6). As however the ejection roller 24 still bears against the locking surface 26 of the locking element 5 that locking element 5 cannot also move with the control element 13 in the direction R, but the force storage means 15 disposed between the control base 22 and the locking element 5 is stressed. That force storage means 15 has a lower spring constant than the force storage means 14. That relief of stress in the force storage means 14 opens up the second travel path W2 between the control element 13 and the locking element 5. The moveable furniture part 2 however is still in the closed position SS in which the ejection lever 4 is held in the locking position V by the locking element 5.

Figure 7:
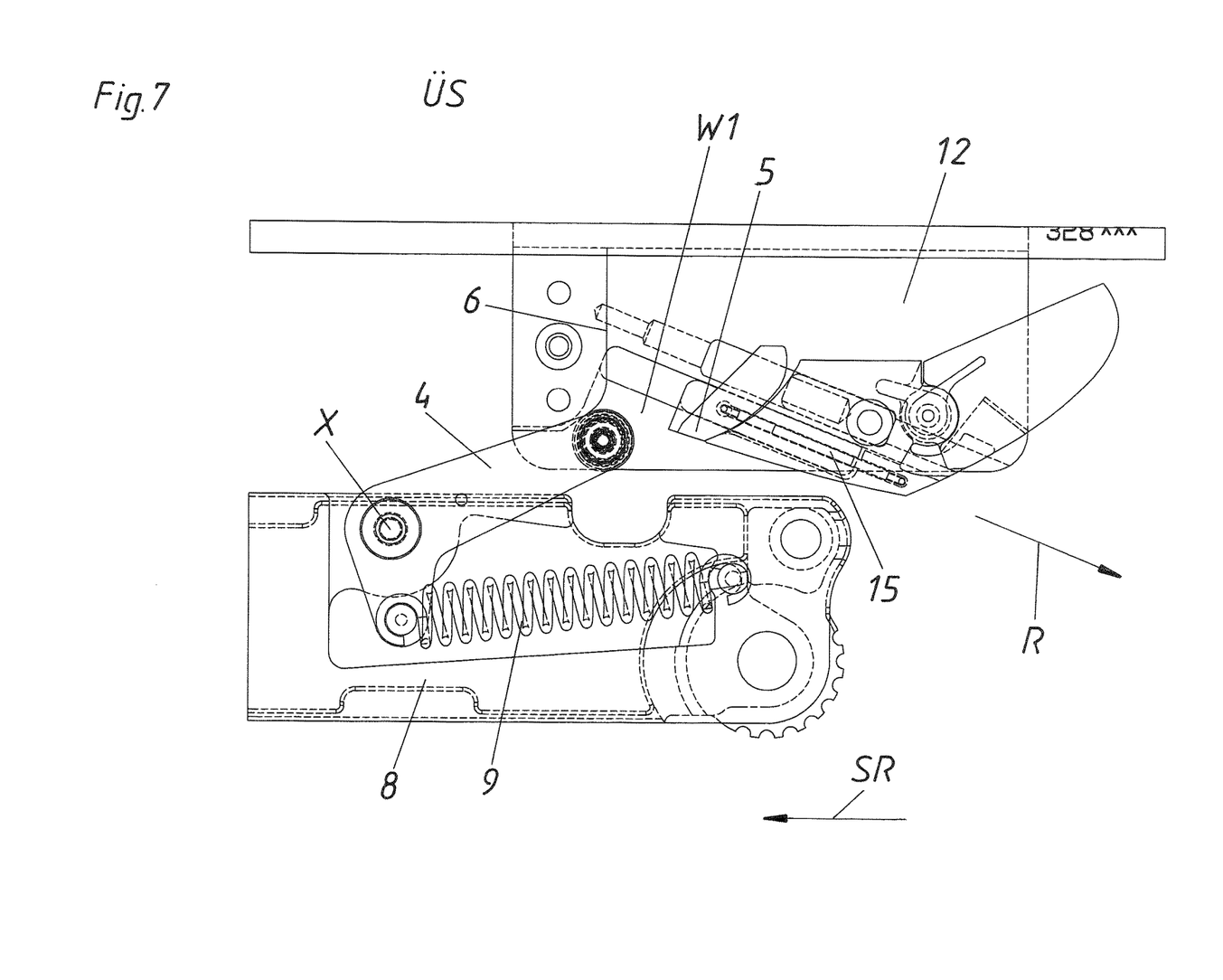
FIG. 7 shows the drive device in the over-pressing position.

If now starting from that position pressure is applied in the closing direction SR to the moveable furniture part 2 the moveable furniture part 2 passes into the over-pressing position ÜS as shown in FIG. 7. Due to that movement in the closing direction SR the ejection lever base plate 8 moves relative to the control plate 12. As the ejection lever 4 must also move with the ejection lever base plate 8 but at the same time also bears against the main ejection surface 6 the ejection lever 4 pivots in the clockwise direction about the pivot axis X so that the mechanical contact between the ejection roller 24 and the locking surface 26 of the locking element 5 is cancelled. As a result the locking element 5 is no longer held by the ejection lever 4 and the force storage means 15 can pull the locking element 5 in the direction R. In that way the first travel path W1 between the locking element 5 and the main ejection surface 6 is enabled.

Figure 8:
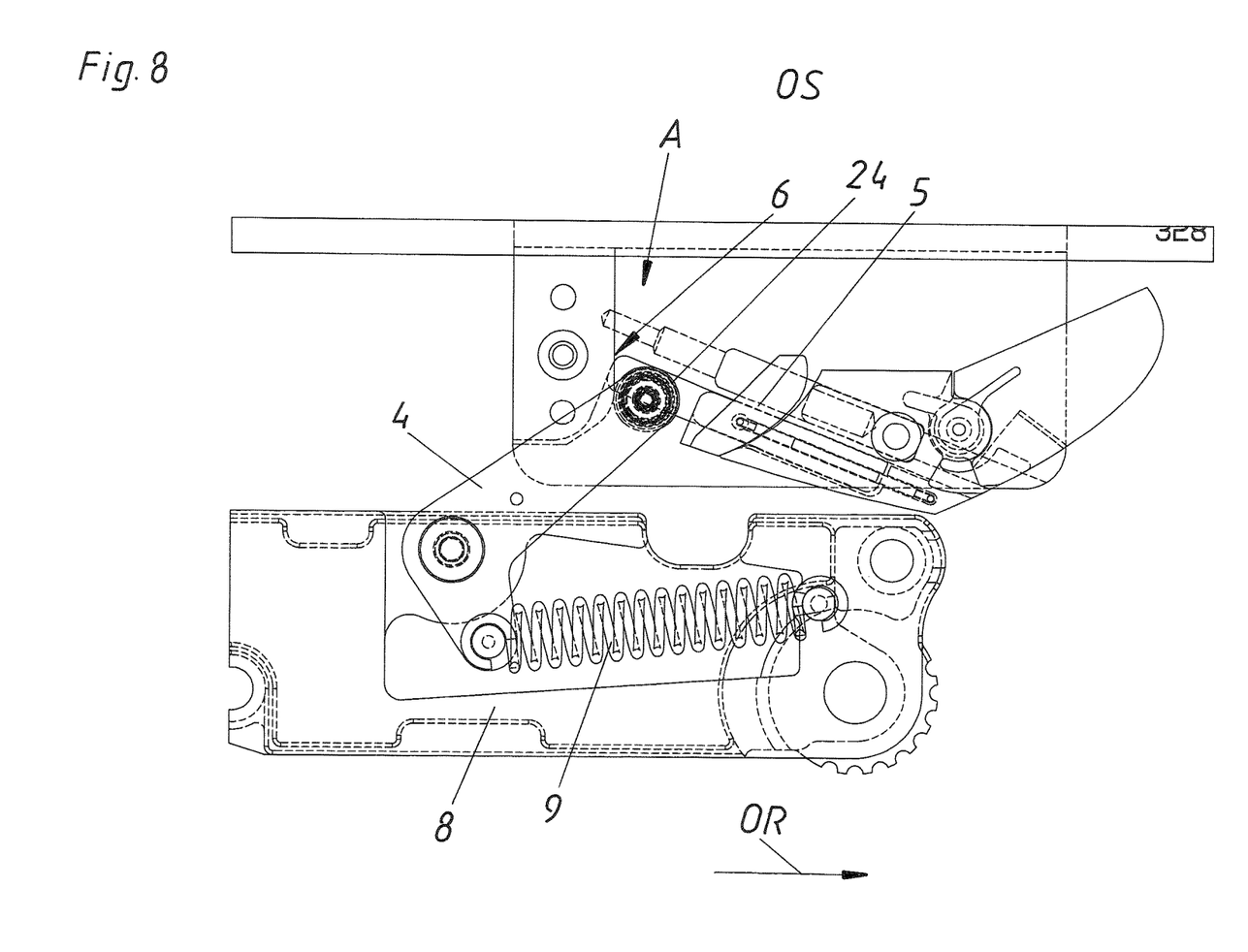
FIG. 8 shows the drive device at the beginning of ejection along the first travel path.

As now the ejection portion A for the ejection lever 4 or the ejection roller 24 is no longer blocked by the locking element 5 the ejection force storage means 9 can be relieved of stress whereby the ejection roller 24 passes along the first travel path W1 into the ejection portion A as shown in FIG. 8. In that way the control plate 8 and therewith the moveable furniture part 2 are also moved in the opening direction OR whereby the moveable furniture part 2 is already in an open position OS.

Figure 9:
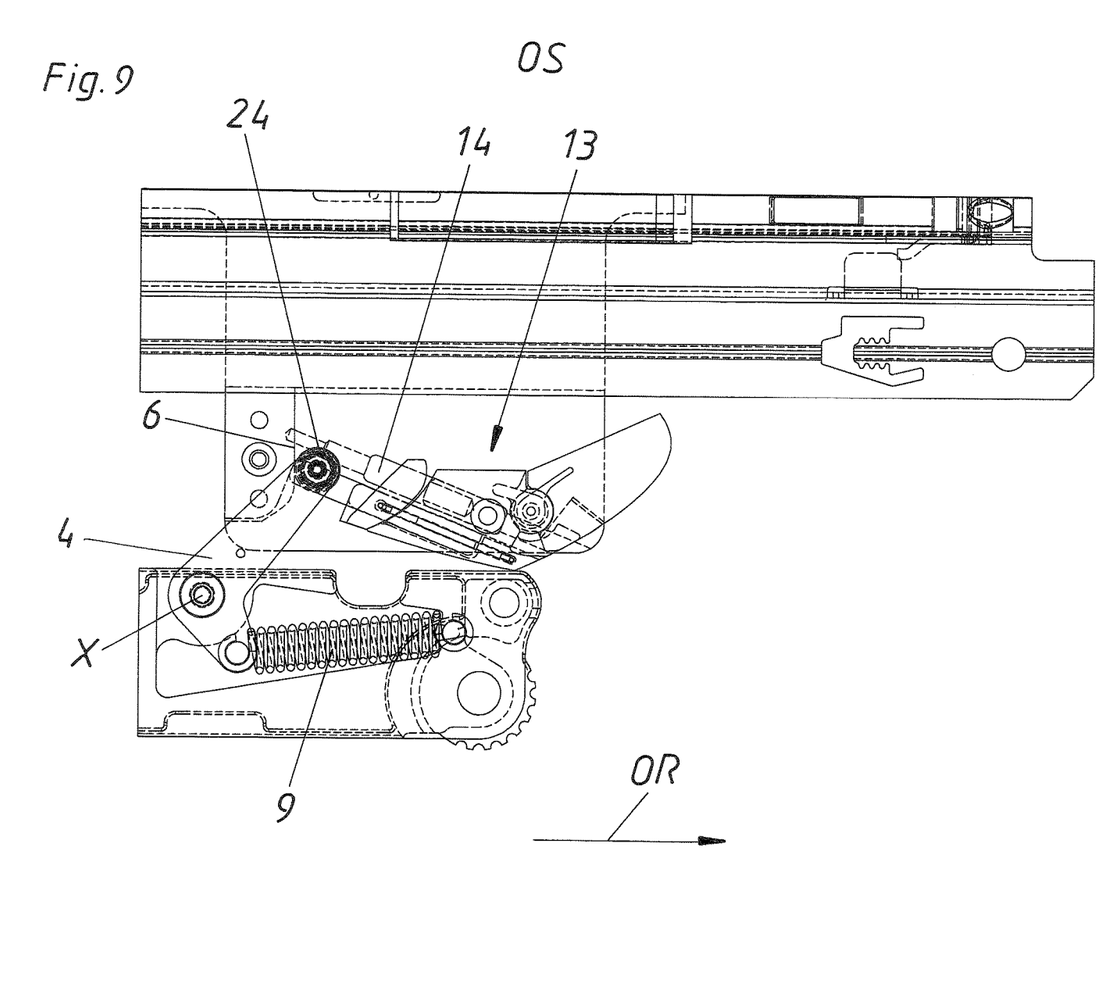
FIG. 9 shows the drive device during ejection.

After further relief of stress of the ejection force storage means 9 the moveable furniture part 2 is still further opened and as shown in FIG. 9 the ejection roller 24 is disposed approximately in the centre of the main ejection surface 6 or the ejection portion A.

Figure 10:
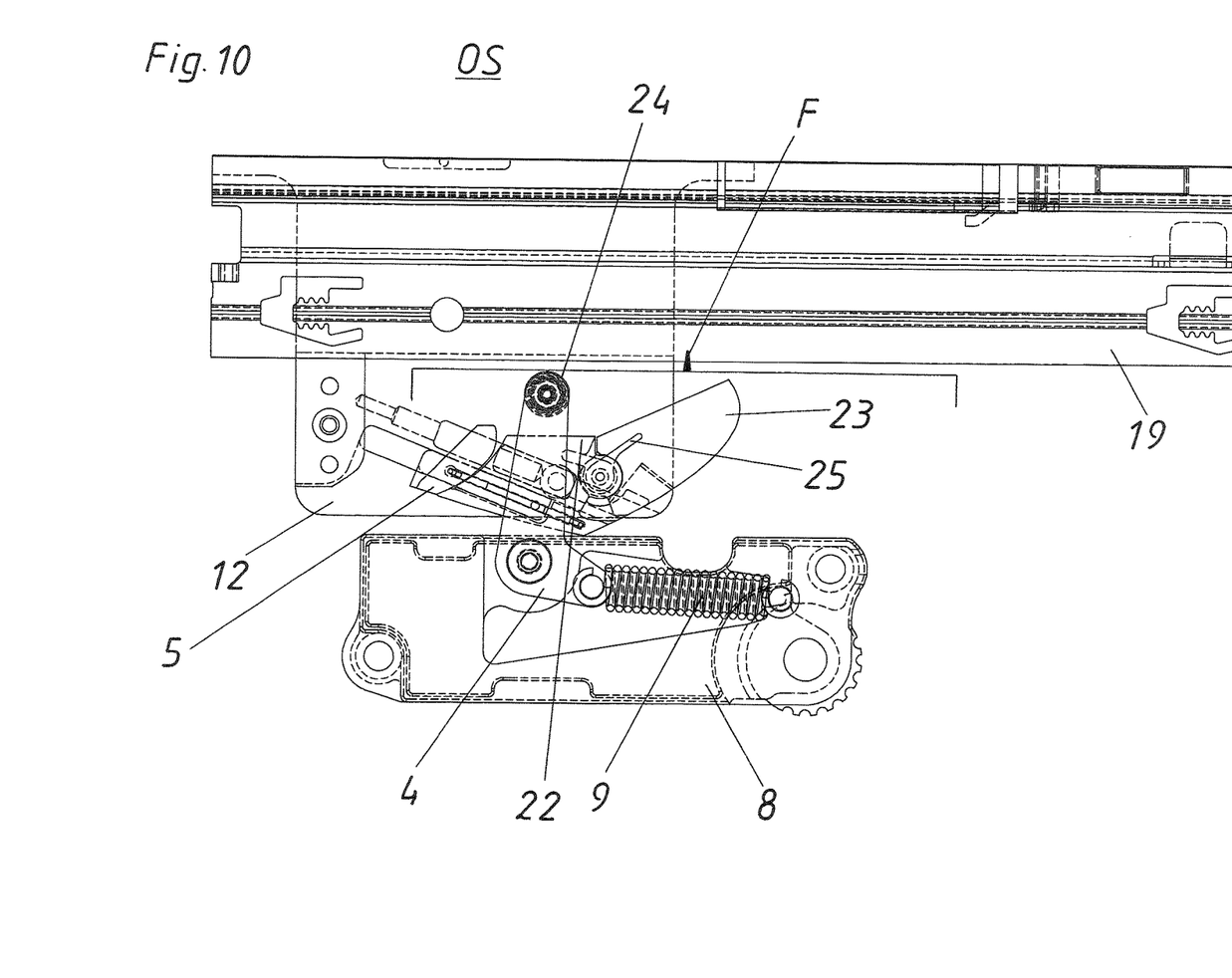
FIG. 10 shows the drive device after ejection.

Subsequently the ejection roller 24 lifts away from the main ejection surface 6 by virtue of the inertia of the ejection device 3 or by pulling on the moveable furniture part 2 and passes into the position shown in FIG. 10 in which the ejection force storage means 9 is relieved of stress and in which the moveable furniture part 2 is freely moveable. By further pulling on the moveable furniture part 2 in the opening direction OR the drive device 1 moves again into the position in FIG. 3. Upon movement in the opening direction OR the flap 23 is rotated in the clockwise direction by the ejection roller 24 against the force of the leg spring 25 so that the ejection lever 4 can move into the position in FIG. 3. After that the flap 23 pivots again in the counter-clockwise direction under the spring force of the spring 25 so that upon later closing the ejection roller 24 does not move back into the free-running portion F but passes into the stressing portion S on the flap 23.

Figure 6:
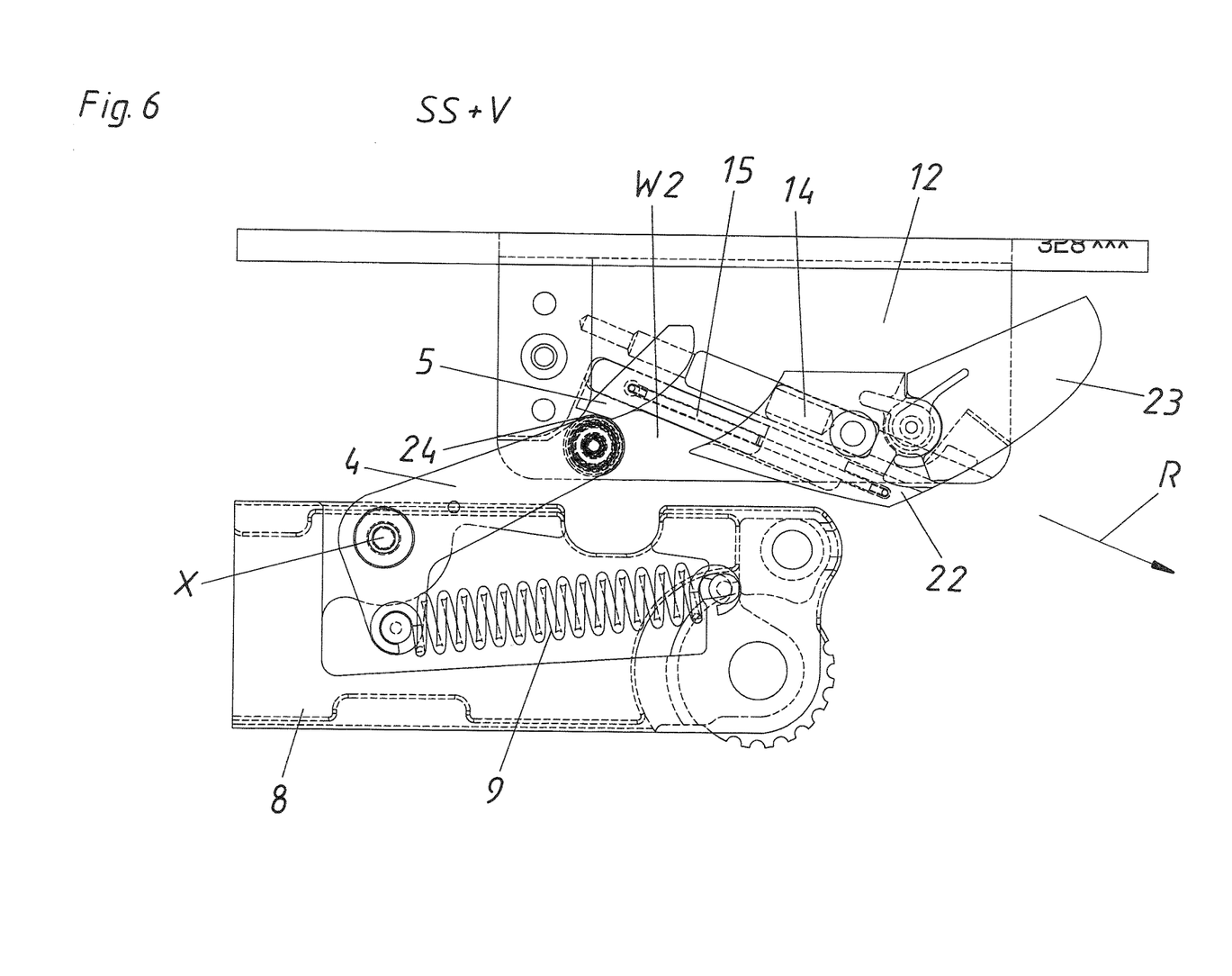
FIG. 6 shows the drive device in the closed position with the second travel path opened.
Figure 11:
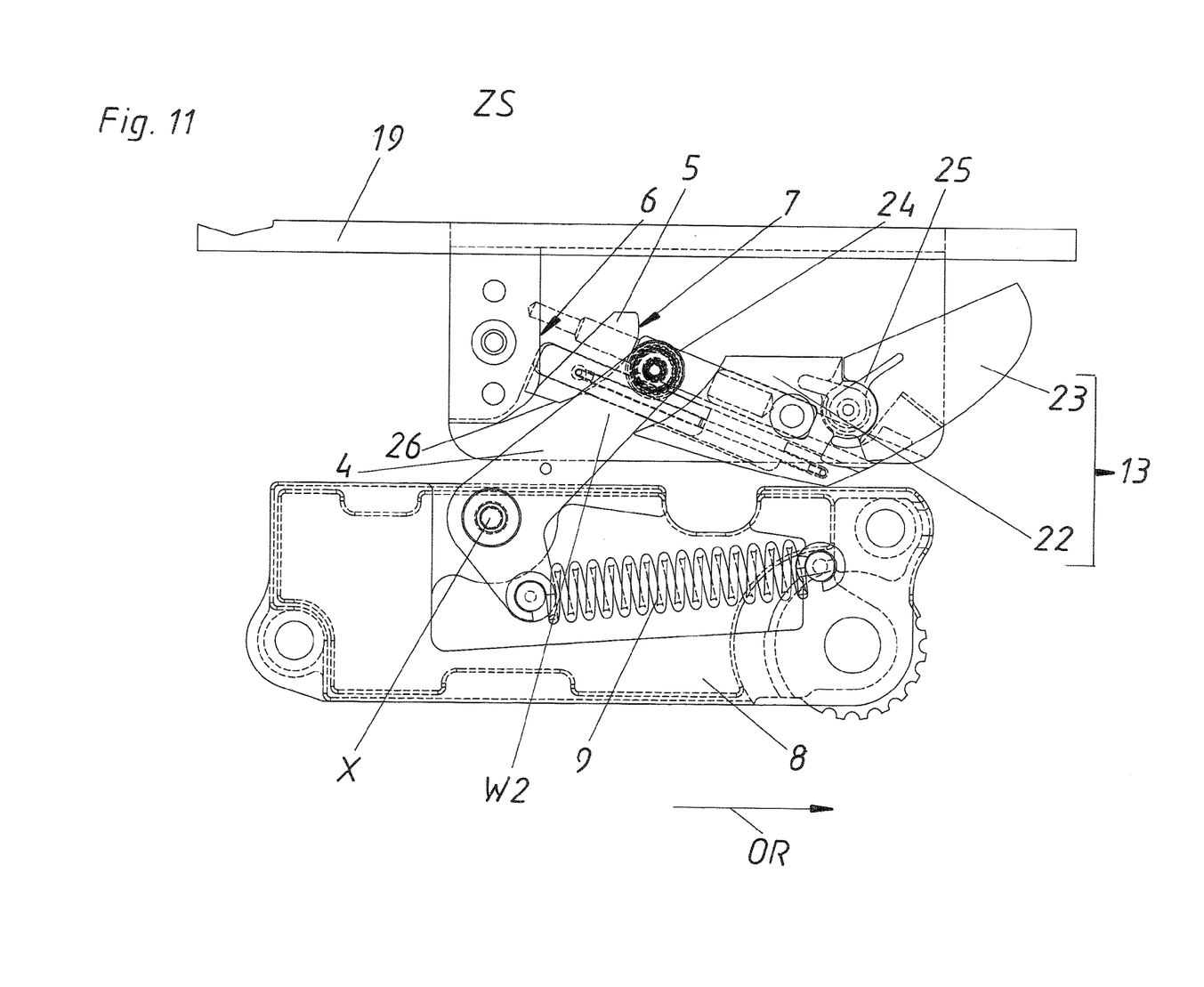
FIG. 11 shows the drive device upon ejection by pulling on the moveable furniture part.

If starting from FIG. 6 unlocking of the lockable ejection device 3 is not effected by over-pressing but by pulling on the moveable furniture part 2 in the opening direction OR then the ejection roller 24 passes into the ejection portion A by way of the second travel path W2. That is shown in FIG. 11. If more specifically starting from FIG. 6 a pulling force is applied to the moveable furniture part 2 the ejection roller 24 comes out of contact with the locking surface 26 and comes into contact with the curved second ejection surface 7 on the locking element 5. As soon as the ejection roller 24 passes into that second travel path W2 or comes into contact with the curved second ejection surface 7 the ejection force storage means 9 can be relieved of stress and pivots the ejection lever 4 about the pivot axis X, with active ejection of the moveable furniture part 2 in the opening direction OR. The curved shape of the second ejection surface 7 serves in particular to avoid swaying and rocking movements of the drawer (moveable furniture part 2) upon being triggered at one side by pressing thereon when the drive device 1 of the same structural configuration which is arranged on the other side of the moveable furniture part 2 is triggered subsequently by pulling. By virtue of that forwardly extended ejection contour the ejection travel path is prolonged along the second ejection surface 7 with the ejection energy remaining the same. The result of this is that the movement of the drawer is greatly improved. In principle however the possibility should be excluded that the locking element 5 has substantially only the locking surface 26 so that, right after unlocking by pulling the ejection roller 24 comes into contact with the main ejection surface 6. It is preferably provided however that the second ejection surface 7 serves as a repulsion surface upon opening by pulling. Upon unlocking by pulling the ejection lever 4 and the ejection roller 24 also subsequently pass into the open position OS by way of the ejection portion A and the free-running portion F, as shown in FIG. 10.

The present invention thus provides an improved drive device 1 in which an ejection lever 4 with a dual function (locking and ejection) can not only be unlocked by over-pressing but is also unlocked by pulling on the moveable furniture part 2 in the opening direction OR so that upon unlocking by pulling the ejection lever 4 actively ejects the moveable furniture part 2 in the opening direction OR.

The invention claimed is:

1. A drive device for a moveable furniture part comprising a lockable ejection device, wherein the ejection device has a force-actuated ejection lever for ejection of the moveable furniture part along an ejection portion from a closed position into an open position, wherein the ejection lever in the closed position bears against a locking element in a locking position and wherein the ejection device is unlockable by movement of the moveable furniture part into an over-pressing position behind the closed position in the closing direction, by the locking element enabling a first travel path into the ejection portion for the ejection lever, wherein by pulling on the moveable furniture part the ejection device can be moved from the closed position into a pulling unlocking position which is before the closed position in the opening direction whereby the ejection lever passes into the ejection portion by way of a second travel path spaced from the first travel path.

2. A drive device as set forth in claim 1, wherein the moveable furniture part is moveable in the opening direction by the force-actuated ejection lever which is in the ejection portion by way of a main ejection surface.

3. A drive device as set forth in claim 1, wherein a second ejection surface spaced from the main ejection surface is provided along the second travel path.

4. A drive device as set forth in claim 3, wherein the second ejection surface is provided on the locking element.

5. A drive device as set forth in claim 1, wherein the ejection lever is mounted rotatably to an ejection lever base plate, wherein an ejection force storage means, preferably a tension spring acting on a leg of the ejection lever, provides for force actuation of the ejection lever.

6. A drive device as set forth in claim 1, wherein the drive device has a guide path for the ejection lever, wherein the guide path has a free-running portion, a stressing portion for stressing the ejection force storage means, a retraction portion for retraction of the moveable furniture part from an open position into the closed position, the first travel path, the second travel path and the ejection portion.

7. A drive device as set forth in claim 6, wherein the stressing portion and the retraction portion are different from the first travel path and the second travel path.

8. A drive device as set forth in claim 6, a control plate and a control element mounted moveably to the control plate, wherein the control element also forms at least the stressing portion and the retraction portion.

9. A drive device as set forth in claim 8, wherein the control element is acted upon by a force storage means which acts on the control element in a direction facing away from the main ejection surface.

10. A drive device as set forth in claim 8, wherein the locking element is mounted moveably, preferably slidably, relative to the control plate.

11. A drive device as set forth in claim 10, wherein the locking element is mounted moveably to the control element.

12. A drive device as set forth in claim 11, wherein the locking element is acted upon by a force storage means pulling the locking element in the direction of the control element.

13. A drive device as set forth in claim 10, wherein the first travel path is arranged between the locking element and the main ejection surface and the second travel path is arranged between the locking element and the control element.

14. An article of furniture having a furniture carcass, a moveable furniture part and a drive device as set forth in claim 1.

15. An article of furniture as set forth in claim 14, wherein the moveable furniture part is mounted moveably to the furniture carcass by way of an extension guide means, the extension guide means having at least a carcass rail and a drawer rail.

16. An article of furniture as set forth in claim 15, wherein the control plate of the drive device is fixed to the carcass rail and the ejection lever base plate is fixed to the drawer rail or the moveable furniture part, preferably at an underside of a drawer bottom.

* * * * *